United States Patent
Zhu et al.

(10) Patent No.: US 7,953,224 B2
(45) Date of Patent: *May 31, 2011

(54) MPEG-4 ENCRYPTION ENABLING TRANSCODING WITHOUT DECRYPTION

(75) Inventors: Bin Zhu, Edina, MN (US); Chang Wen Chen, Melbourne, FL (US); Shipeng Li, Redmond, WA (US); Yang Yang, Xuzhou (CN)

(73) Assignee: Microsoft Corporation, Redmond, WA (US)

( * ) Notice: Subject to any disclaimer, the term of this patent is extended or adjusted under 35 U.S.C. 154(b) by 1149 days.

This patent is subject to a terminal disclaimer.

(21) Appl. No.: 11/419,464

(22) Filed: May 19, 2006

(65) Prior Publication Data

US 2006/0282665 A1     Dec. 14, 2006

Related U.S. Application Data

(60) Provisional application No. 60/683,111, filed on May 20, 2005.

(51) Int. Cl.
 *H04L 9/00*     (2006.01)
(52) U.S. Cl. .......... 380/217; 380/37; 380/200; 380/239; 380/261; 713/160; 713/184
(58) Field of Classification Search .................... 380/37, 380/200, 239, 261; 713/160, 184
See application file for complete search history.

(56) References Cited

U.S. PATENT DOCUMENTS

| | | | | |
|---|---|---|---|---|
| 6,996,173 B2 * | 2/2006 | Wu et al. | ..................... | 375/240.1 |
| 7,095,782 B1 * | 8/2006 | Cohen et al. | ............. | 375/240.01 |
| 7,136,485 B2 * | 11/2006 | Wee et al. | ........................ | 380/37 |
| 7,155,448 B2 * | 12/2006 | Winter | .......................... | 707/101 |
| 7,248,740 B2 * | 7/2007 | Sullivan | ......................... | 382/232 |
| 7,274,661 B2 * | 9/2007 | Harrell et al. | .................. | 370/229 |
| 7,561,933 B2 * | 7/2009 | Oh et al. | ......................... | 700/94 |
| 7,586,425 B2 * | 9/2009 | Ridge et al. | ...................... | 341/67 |
| 2002/0018565 A1 * | 2/2002 | Luttrell et al. | ................. | 380/217 |
| 2004/0028227 A1 * | 2/2004 | Yu | .................................. | 380/201 |
| 2004/0030665 A1 * | 2/2004 | Sullivan | .......................... | 706/48 |
| 2004/0156433 A1 * | 8/2004 | Comer et al. | .............. | 375/240.2 |
| 2004/0170277 A1 * | 9/2004 | Iwamura et al. | .............. | 380/217 |
| 2006/0133472 A1 * | 6/2006 | Bruls et al. | .................. | 375/240.1 |
| 2006/0265601 A1 | 11/2006 | Zhu et al. | | |

OTHER PUBLICATIONS

A. Menezes, P. van Oorschot, and S. Vanstone, "Handbook of Applied Cryptography," 1997 by CRC Press, Inc. chapter 7, pp. 222-282.*

(Continued)

*Primary Examiner* — Carl Colin
(74) *Attorney, Agent, or Firm* — Perkins Coie LLP (57) ABSTRACT

A method and system for encrypting a video compressed with MPEG-4 FGS compression with minimal overhead is provided. The encryption system encrypts the video into independently encrypted segments that can be either a video packet or a video block. When the encryption system encrypts based on video packets, it encrypts the data to ensure that the encrypted data does not emulate any video packet delimiting markers. When the encryption system encrypts based on video blocks, it encrypts the coded bitstream for each video block independently, from the most significant bitplane to the least significant bitplane, using either a stream or a block cipher. After all the video blocks are independently encrypted, the encryption system partitions the encrypted data into video packets and adds a buffering bit, if necessary, to prevent emulation of video packet delimiting markers. The encryption system may generate an initialization vector for each independently encrypted segment.

17 Claims, 5 Drawing Sheets

OTHER PUBLICATIONS

Chun Yuan, Bin B. Zhu, Yidong Wang, Shipeng Li, Yuzhuo Zhong; "Efficient and Fully Scalable Encryption for MPEG-4 FGS"; 2003; 4 Pages.*

Wee et al; "Secure Scalable Streaming and Secure Transcoding with JPEG-2000";HP Laboratories Palo Alto HPL-2003-117 Jun. 13, 2003; 5 Pages.*

"Crypto++® Library 5.2.1," 6 pages [last accessed Sep. 27, 2005].

"Gormish Notes on JPEG 2000," 8 pages [last accessed May 11, 2005].

"The JPEG2000 Resource Web Page," VIPER, 5 pages [last accessed Apr. 4, 2005].

Grosbois, Raphael et al., "Authentication and access control in the JPEG 2000 compressed domain," In Proc. of the SPIE 46th Annual Meeting, Applications of Digital Image Processing XXIV, San Diego, Jul. 29-Aug. 3, 2001, pp. 1-10.

Li, Weiping, "Overview of Fine Granularity Scalability in MPEG-4 Video Standard," IEEE Transactions on Circuits and Systems for Video Technology, vol. 11, No. 3, Mar. 2001, pp. 301-317.

Marcellin, Michael et al., "An Overview of JPEG-2000," Proc. of IEEE Data Compression Conference, 2000, pp. 523-541.

Wee, Susie et al., "Secure Scalable Streaming Enabling Transcoding without Decryption," Image Processing International Conference on 2001, vol. 1, pp. 437-440.

Wu, Feng et al., "SMART: An Efficient, Scalable, and Robust Streaming Video System," EURASIP Journal on Applied Signal Processing 2004, 35 pages.

Wu, Feng et al., "SMART: An Efficient, Scalable, and Robust Streaming Video System," EURASIP Journal on Applied Signal Processing 2004, 39 pages.

Wu, Hongjun et al., "Efficient and Secure Encryption Schemes for JPEG2000," Proc. IEEE Int. Conf. Acoust. Speech Signal Process, 2004, pp. V-869-V-872.

Wu, Min et al., "Communication-Friendly Encryption of Multimedia," Signal processing, IEEE Workshop, Dec. 9-11, 2002, 4 pages.

Wu, Yongdong et al., "Complaint Encryption of JPEG2000 Codestreams," 2004 IEEE, pp. 3439-3442.

Yuan, Chun et al., "Layered Access Control for MPEG-4 FGS Video," ICIP, International Proceeding Sep. 14-17, 2003, 4 pages.

Zhu, Bin et al., "Encryption and Authentication for Scalable Multimedia: Current State of the Art and Challenges," Proc. SPIE, 2004, 14 pages.

Zhu, Bin et al., "JPEG 2000 Encryption Enabling Fine Granularity Scalability without Decryption," Circuits and Systems, IEEE International Symposium on May 23-26, 2005, vol. 6, 4 pages.

Zhu, Bin et al., "Scalable Protection for MPEG-4 Fine Granularity Scalability," IEEE Transactions on Multimedia, vol. 7, No. 2, Apr. 2005, pp. 222-233.

Crypto++® Library 5.2.1, 6 pages [last accessed Sep. 27, 2005].

Lian et al., "A Selective Image Encryption Scheme Based on JPEG2000 Codec," PCM 2004, LNCS 3332, pp. 65-72, 2004.

Zhu, Bin et al., "JPEG 2000 Syntax-Compliant Encryption Preserving Full Scalability," Image Processing, 2005, IEEE International Conference on ICIP 2005, 4 pages.

* cited by examiner

MPEG-4 ENCRYPTION ENABLING TRANSCODING WITHOUT DECRYPTION

CROSS-REFERENCE TO RELATED APPLICATIONS

This application claims the benefit of U.S. Provisional Patent Application No. 60/683,111, entitled "Syntax Compliant Encryption for JPEG 2000 and Motion JPEG 2000" filed on May 20, 2005 and is related to U.S. patent application Ser. No. 11/419,468 entitled "JPEG 2000 Syntax-compliant Encryption With Full Scalability" filed concurrently, which are hereby both incorporated by reference.

BACKGROUND

Videos can be compressed using MPEG-4 compression. MPEG-4 compression incorporates many compression features of MPEG-1 and MPEG-2 such as frame types (I-frames, B-frames, and P-frames), motion compensation, group of pictures, and macroblocks. MPEG-4 also introduces the concept of an object. Objects are parts of scenes that can be coded as separate video objects. For example, a person in a scene can be coded as a video object that is separate from the coding of the background of the scene. The separate coding of objects allows different parts of a scene to be coded with different resolutions. For example, the object representing a person can be coded at a higher resolution than the background.

MPEG-4 codes a video hierarchically. A video object may be sampled at each frame of a scene to generate a video object plane ("VOP"). A VOP may be coded using various frame types or using motion compensation. A sequence of VOPs can be grouped together into a group of VOPs ("GOV"). GOVs, like VOPs, can be coded independently. MPEG-4 organizes the VOPs or GOVs into video object layers ("VOLs"). The VOLs for a video object are further organized into a video object ("VO") level, which includes all the bitstreams, for that video object. The video object levels of a scene are organized into a video session ("VS") for the scene.

The spatial and temporal scalability of MPEG-4 is provided at the VO level. MPEG-4 provides scalability using a base layer and enhancement layers. The base layer represents the lowest quality supported by a bitstream, and each enhancement layer provides increasingly higher quality. To provide spatial scalability, each VOP is converted from its original resolution to a lower resolution as a base layer and the difference between the lower resolution and the original resolution is represented in the enhancement layers. When a device receives an MPEG-4 video, it can present the video using the base layer alone or using the base layer and one or more enhancement layers. Similarly, when a routing device receives an MPEG-4 video, it can forward the base layer only or forward the base layer along with one or more of the enhancement layers.

MPEG-4 was amended to allow for Fine Grain Scalability ("FGS") to support environments (e.g., streaming media) where scalability based on base and enhancement layers is too coarse and does not provide the needed flexibility, or the coders and decoders for multiple enhancement layers are too complex and thus too expensive. FGS provides a base layer and one enhancement layer. The base layer is encoded with a non-scalable coder to provide the lowest quality bitrate for a scalable codestream. The enhancement layer is coded into bitplanes from the most significant bitplane to the least significant bitplane. In particular, the difference between the original VOP and the reconstructed VOP from the base layer is encoded bitplane-wise from the most significant bitplane to the least significant bitplane. Each bitplane of a macroblock's discrete cosine transform ("DCT") coefficients is zigzag ordered, converted to run and end-of-plane (RUN, EOP) symbols, and coded with variable-length coding to produce an enhancement layer codestream. RUN is the number of consecutive zeros before a nonzero value, and EOP indicates if any non-zero values are left on the current bitplane for the block. For FGS Temporal ("FGST"), which does not have corresponding base layer VOPs, the bitplane coding is applied to the entire DCT coefficients of the VOP. MPEG-4 FGS provides very fine grain scalability to allow near rate-distortion (RD) optimal bitrate truncation for a large range of bitrates. An FGS video can be truncated to the base layer or any bitplane of the enhancement layer depending on channel capacity or display device capability.

MPEG-4 FGS groups video data into Video Packets ("VPs") that contain independently coded data. Each VP is delimited by unique resynchronization markers to prevent error propagation to other VPs. Information is inserted after a resynchronization marker to enable resuming decoding in the event that a VP is damaged in transmission. For the enhancement layer, both the bitplane start marker (i.e., fgs_bp_start_code) and the resynchronization marker (i.e., fgs_resync_marker) are used as VP delimiters. The fgs_bp_start_code is 32 bits, starting with 23 binary zeros followed by 0xA and five bits indicating to which bitplane the data belongs. The fgs_r-esync_marker is 22 binary zeros followed by a binary one. The number of the first macroblock is inserted after each marker fgs_resync_marker. The VP boundary is aligned with a macroblock. If an error occurs in coded bitplane data, the bitplane data of the current and subsequent blocks of that bitplane cannot be correctly decoded, and will be discarded. The lower bitplane data of those affected blocks are also discarded because the alignment of the sign bits cannot be determined. In particular, a sign bit for a DCT coefficient is encoded with the bitplane that has the most significant "1" for that DCT coefficient. So, if an error occurs in the bitplane, the sign bits for lower bitplanes become misaligned and cannot be properly decoded. The size of a VP can be determined at encoding time based on different scenarios. For example, if the video is being transmitted on a highly reliable channel, a large VP may be used as errors and corrupted VPs will be rare. In contrast, if the channel is unreliable and prone to errors (e.g., a wireless channel), a small VP may be used so that not much video information is lost with each frequent error.

Encryption can be applied to MPEG-4 FGS video codestreams to protect videos from unauthorized access or usage. An important requirement for encryption of scalable codestreams is that the encrypted codestream should preserve as fine as possible granularity for scalability so that it can be truncated directly by an encryption-unaware device without decryption. In other words, as a video is processed by intermediaries, it is desirable that those intermediaries can reduce the scale (e.g., resolution) of the video without having to decrypt the video. A desirable requirement for MPEG-4 FGS encryption is that an encrypted codestream is still compliant to the MPEG-4 FGS syntax and that encrypted data does not emulate any MPEG-4 FGS delimiters to avoid erroneous parsing or synchronization, especially under error-prone transmissions.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A method and system for encrypting a video compressed with MPEG-4 FGS compression with minimal overhead is provided. The encryption system encrypts the video into independently encrypted segments that can be either a video packet or a video block. When the encryption system encrypts based on video packets, it may encrypt the data using Ciphertext Switching Encryption or Locally Iterative Encryption to ensure that it is syntax compliant with MPEG-4 FGS compression. When the encryption system encrypts based on video blocks, it encrypts the coded bitstream independently for each video block from the most significant bitplane to the least significant bitplane using either a stream or a block cipher. After all the video blocks of a video packet are independently encrypted, the encryption system adjusts the encryption to ensure that it is syntax compliant with MPEG-4 FGS compression. The encryption system may generate an initialization vector ("IV") for each independently encrypted segment. The IV for a segment may be generated as a function of a global IV and a unique identifier of the segment. The encryption system ensures that an encrypted video is syntax compliant with MPEG-4 FGS compression and is fully scalable.

DETAILED DESCRIPTION

A method and system is provided for encrypting a video compressed with MPEG-4 FGS with minimal overhead so that the encrypted codestream does not emulate MPEG-4 delimiting markers in the encrypted data and can be scaled at fine granularity without decrypting. In one embodiment, the encryption system encrypts a video into independently encrypted segments that can be either a video packet ("VP") or a video block. When the encryption system encrypts based on video packets, referred to a video packet mode encryption, it encrypts the data using Ciphertext Switching Encryption ("CSE") or Locally Iterative Encryption ("LIE") to ensure that no VP delimiters appear in the encrypted data. The encryption system does not encrypt the VP header or the macroblock numbers so that the encrypted codestream provides the necessary synchronization markers for an encryption-unaware device. When the encryption system encrypts based on video blocks (e.g., a macroblock or some smaller block), referred to as video block mode encryption, it encrypts the coded bitstream for each video block independently, from the most significant bitplane to the least significant bitplane, using either a stream or a block cipher. After all the video blocks of a VOP are independently encrypted, the encryption system partitions and adjusts the encrypted data into VPs so that no VP delimiters appear in the encrypted data contained in a VP. The encryption system generates an initialization vector ("IV") for each independently encrypted segment. The IV for a video block may be generated as a function of a global IV and the video block's index and bitplane color component. The IV for a VP may be generated as a function of a global IV and the number of the first macroblock and a bitplane identifier of the macroblock. In this way, the encryption system can ensure that an encrypted video has negligible overhead without emulating VP delimiting markers and is fully scalable.

Video packet mode encryption encrypts each VP independently. The encryption system may use syntax-compliant encryption schemes such as Ciphertext Switching Encryption or Locally Iterative Encryption to ensure that the ciphertext does not emulate VP delimiters. The encryption system ensures that the ciphertext does not contain any string of byte-aligned 22 consecutive binary zeros, which corresponds to a VP delimiter in MPEG-4 FGS. When a stream cipher is used, the encryption system applies CSE and LIE directly and the ciphertext has the same size as the plaintext. When a block cipher is used with LIE, the encryption system uses both Cipher Block Chaining ("CBC") and Cipher-Feedback ("CFB") modes to produce syntax-compliant ciphertext with the same size as input for plaintext of arbitrary size. The encryption system partitions the plaintext into blocks. Each block, except the last one, has the same size as the encryption block used by the block cipher. The last block may be a partial block that does not have enough data to be a full block. The encryption system encrypts each full block using a block cipher with LIE in CBC mode. The encryption system encrypts the last partial block, if any, with the same block cipher with LIE in CFB mode. If the VP includes at least one full block, the encryption system initializes the shift register for CFB mode with the ciphertext of the last full block. Otherwise, the encryption system initializes the shift register with the IV. The encryption system may use video packet mode encryption to encrypt both the base layer and the enhancement layer. Video packet mode encryption allows truncation of trailing data in an encrypted VP. Moreover, when an error occurs in ciphertext, only the current and subsequent blocks in the VP are discarded, rather than the entire VP.

Video block mode encryption encrypts each video block independently. When in video block encryption mode, the encryption system encrypts each block of the bitstream of the enhancement layer independently, from the most significant bitplane to the least significant bitplane. The encryption system uses a stream or block cipher. The encryption system partitions the resulting ciphertext into smaller groups. allocates the groups to each bitplane, and then packs the groups into VPs. If the encryption system uses a stream cipher, such as Rivest's Cipher 4 ("RC4") or Software Encryption Algorithm ("SEAL"), it sets the grouping boundary at the end of each bitplane for the video block. As a result, the encrypted Contribution of a Block to a Bitplane ("CBB") contains the same number of bits as the unencrypted CBB. If the encryption system uses a block cipher, it aligns the grouping boundary with the encryption block size of the block cipher. For example, if Advanced Encryption Standard ("AES") is used with a block size of 128 bits, then each CBB contains a multiple of 128 bits. An encrypted CBB thus would contain more bits than the unencrypted CBB. The extra data is from a lower bitplane of the video block. Extra data ensures that the CBB can be decrypted even if VPs of lower bitplanes are truncated or lost in the process of transmission. As a result, the use of a block cipher introduces an overhead when truncation occurs at the bitplane. Thus, when overhead is a concern, a stream cipher can be used to eliminate this overhead.

When in video block encryption mode, once a VP has all the CBBs from contributing video blocks, the encryption system checks the encrypted data to determine whether it contains any VP delimiters. If it finds a byte-aligned substream of 21 binary zeros, it inserts a binary "1" at the end of the substream. By inserting the "1," the encryption system avoids emulating VP delimiters, fgs_bp_start_code and fgs_resync_marker, of the enhancement layer. When the VP is decrypted, the decryption system removes each binary "1" after a byte-aligned substream of 21 binary zeros.

During decryption of a video encrypted using video block mode, the decryption system checks the Variable Length Codes ("VLCs") for the end of a video block. Once the end of a video block is found, the decryption system uses the decryption of the next video block to decrypt the rest of the VP until the end of the block is found. This process continues until all the encrypted data in a VP is decrypted to corresponding individual video blocks. When a block cipher is used, a CBB may contain some extra data for the next lower bitplane(s) of the video block. The decryption system combines this extra data with the decrypted data of the next lower bitplane for decoding. If all the data of a bitplane of a video block is contained in the CBB of the higher bitplane of the block, the decryption system marks the current bitplane of the video block as empty. The decryption system detects this case and inputs the right bitplane data to the decoder.

The encryption system generates an IV for each encrypted segment so that they can be independently encrypted. The encryption system uses different IVs to encrypt different segments to avoid identical ciphertext when different segments of plaintext are identical. Other techniques, such as a reversible bilinear hash function, may used to avoid such identical ciphertext. These techniques, however, results in later encrypted data affecting already encrypted data. The use of different IVs results in the encryption of later data not affecting already encrypted data and thus enabling truncation of trailing ciphertext and only forward error expansion (i.e., an error affects only the current and later decrypted data of the segment).

The encryption system generates a unique identifier for each segment and uses that identifier to generate a unique IV. The encryption system uniquely identifies each video block in a VOP using the video block's index and color component. In MPEG-4 FGS, the number of the first macroblock is inserted right after each fgs_resync_marker. The macroblock after fgs_bp_start_code is always the first macroblock. The last five bits in fgs_bp_start_code are used to identify the bitplane. Therefore, the encryption system uses the bitplane identifier in fgs_bp_start_code and the number of the first macroblock to uniquely identify a VP in a VOP. The encryption system uses the unique identifier of a segment to generate the IV used to encrypt the segment so the IV for each independent encryption need not be inserted into the codestream, which would otherwise cause a large overhead.

The encryption system may use different techniques for generating IVs depending on the format of the codestream. A codestream may contain persistent presentation time or other attributes unique to each VOP, which are invariant throughout the life of the codestream, even when some VOPs are lost. In such a case, the encryption system uses this unique VOP identification attribute to generate IVs for the VOP. The encryption system inserts a random IV into the codestream as a global IV. The encryption system generates the IV by hashing together the unique VOP identification attribute, the layer identifier (i.e., base layer or enhancement layer), and the unique segment identifier. If such a persistent VOP identifier does not exist, then the encryption system inserts an independent random IV ("VOP IV") for each VOP into the base VOP for FGS VOP and into the FGST VOP otherwise. To generate the IV, the encryption system combines the segment identifier with the layer ID (which is used to identify base or enhancement layer), copy-expands the combination to the length of the IV, and XORs it with the VOP IV of the segment. The encryption system uses the result as an IV for a stream cipher to encrypt the segment. When a block cipher is used, the encryption encrypts the result with the block cipher and uses it as the IV to encrypt the segment.

Figure 1:
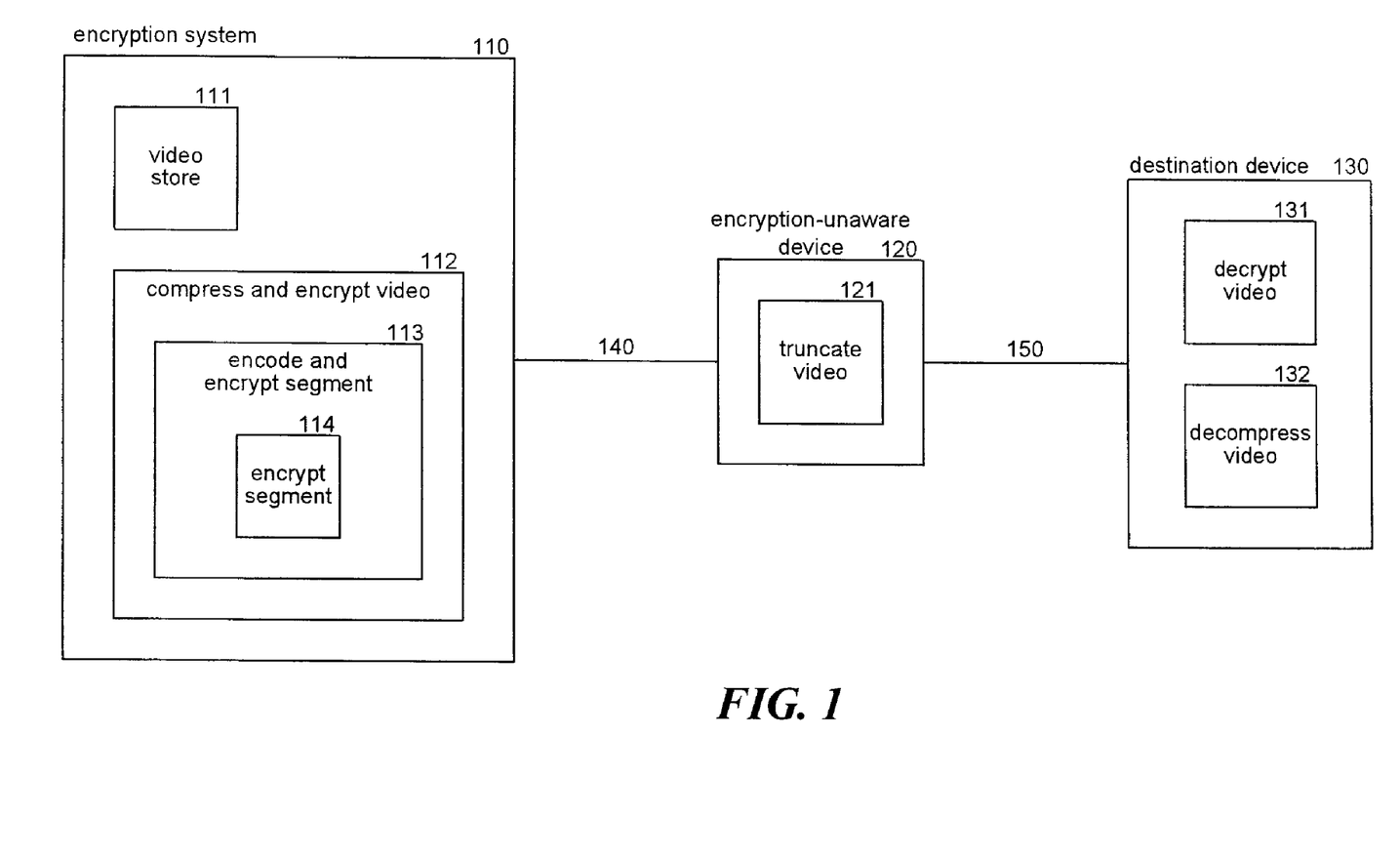
FIG. 1 is a block diagram that illustrates components of the encryption system in one embodiment.

FIG. 1 is a block diagram that illustrates components of the encryption system in one embodiment. The encryption system 110 is connected to a destination device 130 via communications links 140 and 150 and an encryption-unaware device 120. The encryption system may compress video data of a video store 111 using a compress and encrypt video component 112. The compress and encrypt video component invokes an encode and compress segment component 113 to encode and compress the segments. An encrypt segment component 114 is invoked by the encode and compress segment component to encrypt segments. After the encryption system encrypts the compressed video data, it forwards the compressed video data to the encryption-unaware device via communications link 140. Because the encrypted video data is still syntax compliant with the compression technique, the encryption-unaware device can truncate the video data in some way that is consistent with the compression scheme using a truncate video component 121. The encryption-unaware device forwards the truncated video data to the destination device via communications link 150. The destination device can decrypt the truncated video data using a decrypt video component 131 and decompress the decrypted video data using a decompress video component 132. The destination device can then display the video.

The encryption system may be implemented in silicon, using discrete logic, a microprocessor, or other computing devices. The computing device on which the encryption system is implemented may include a central processing unit, memory, input devices (e.g., keyboard and pointing devices), output devices (e.g., display devices), and storage devices (e.g., disk drives). The memory and storage devices are computer-readable media that may contain instructions that implement the encryption system.

The encryption system may be implemented in various operating environments that include personal computers, server computers, multiprocessor systems, microprocessor-based systems, programmable consumer electronics, network PCs, minicomputers, mainframe computers, distributed computing environments that include any of the above systems or devices, and the like.

The encryption system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments and may be implemented in hardware or software.

Figure 2:
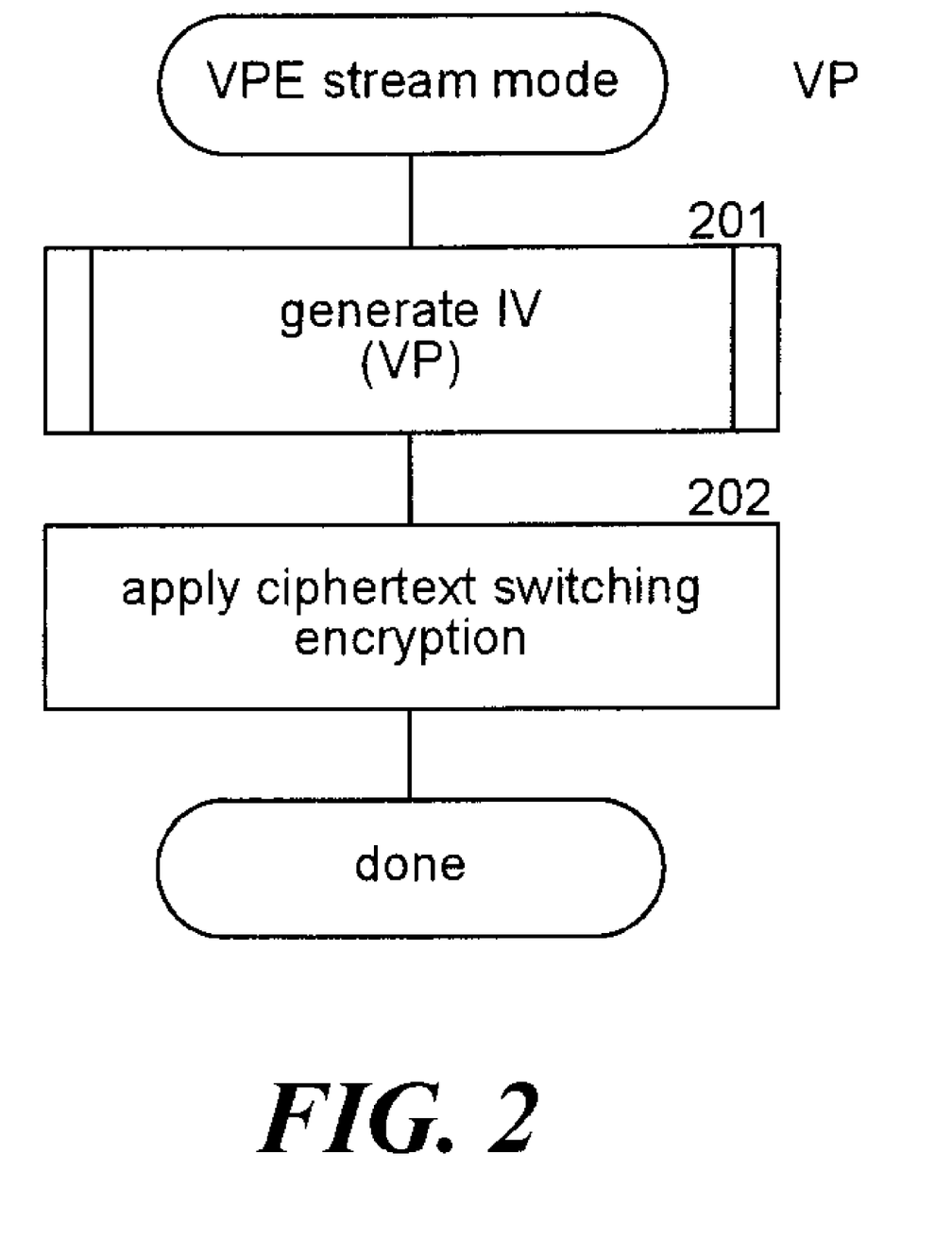
FIG. 2 is a flow diagram that illustrates the processing of a video packet mode encryption component with a stream cipher in one embodiment.

FIG. 2 is a flow diagram that illustrates the processing of a video packet mode encryption component with a stream cipher in one embodiment. The component is passed a video packet and returns the video packet encrypted with a stream cipher. In block 201, the component invokes the generate IV component requesting that an IV for a video packet be generated. In block 202, the component applies a Ciphertext Switching Encryption technique to encrypt the data in the video packet ensuring that the encrypted video packet does not increase its size and is syntax compliant. Alternatively, the component may apply a Locally Iterative Encryption technique. The component then returns the encrypted video packet.

Figure 3:
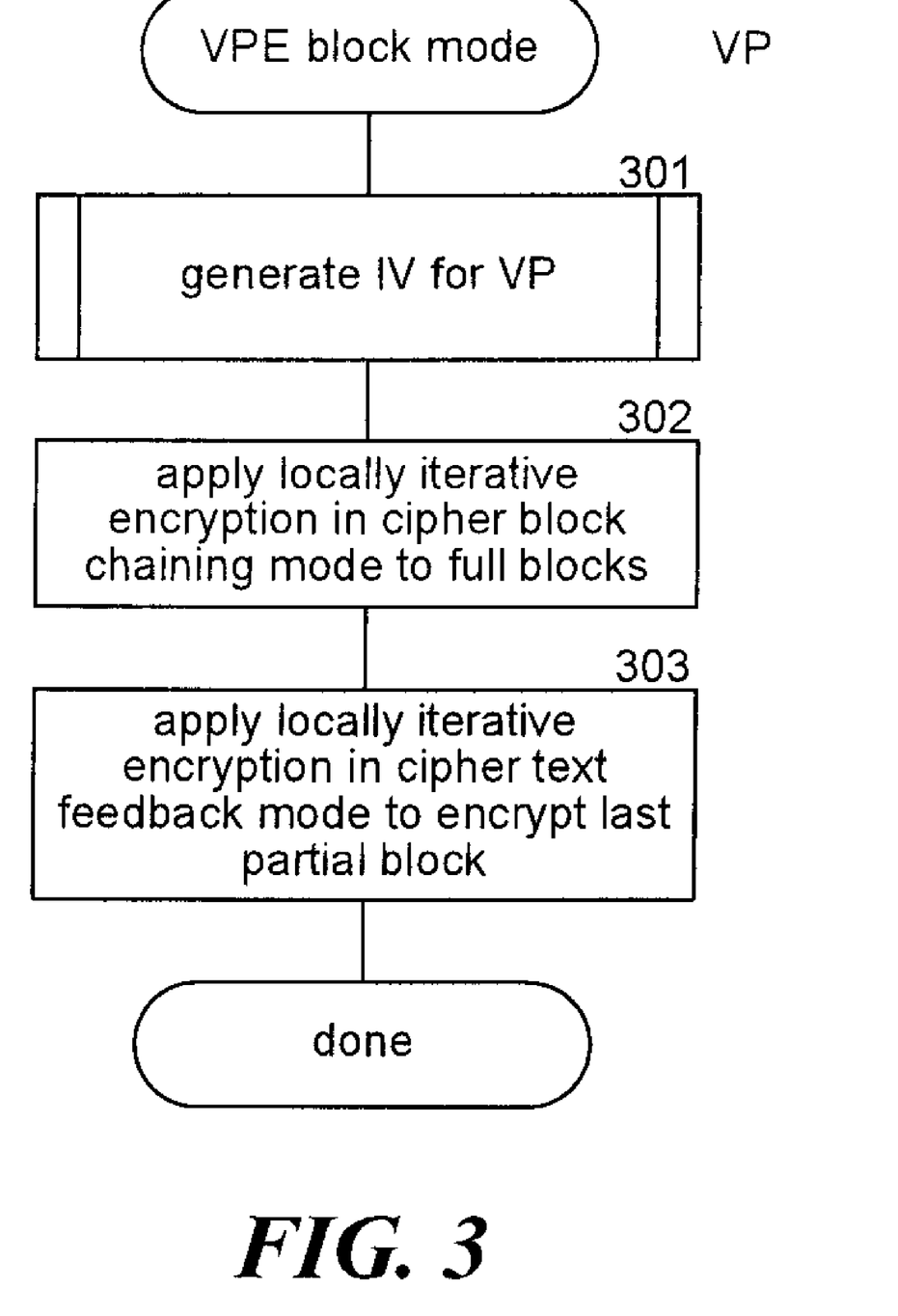
FIG. 3 is a flow diagram that illustrates the processing of a video packet mode encryption component with a block cipher in one embodiment.

FIG. 3 is a flow diagram that illustrates the processing of a video packet mode encryption component with a block cipher in one embodiment. The component is passed a video packet and returns the video packet encrypted with a block cipher. In block 301, the component invokes the generate IV component requesting that an IV for a video packet be generated. In block 302, the component applies a Locally Iterative Encryption technique in Block Channel Mode to all the full blocks of the data in the video packet. In block 303, the component applies a Locally Iterative Encryption technique in Cipher Text Feedback Mode to encrypt the last partial block, if any, of the data in the video packet. The component then returns the encrypted video packet.

Figure 4:
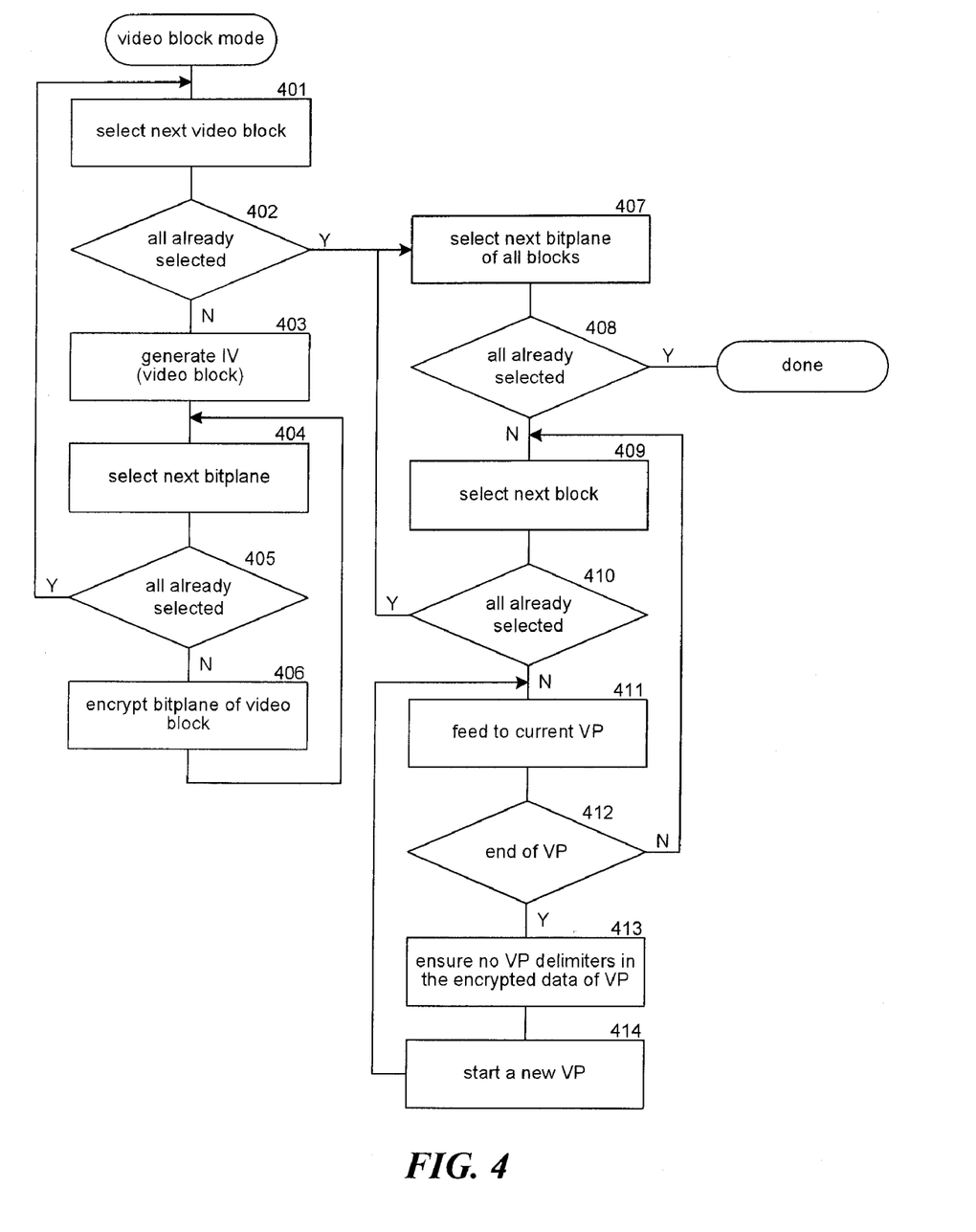
FIG. 4 is a flow diagram that illustrates the processing of a video block mode encryption component in one embodiment.

FIG. 4 is a flow diagram that illustrates the processing of a video block mode encryption component in one embodiment. The component is passed video blocks of a VOP and returns the encrypted video packets of the VOP. In blocks 401-406, the component loops selecting each video block and encrypting its bitplanes. In block 401, the component selects the next video block. In decision block 402, if all the video blocks have already been selected, then the component continues at block 407, else the component continues at block 403. In block 403, the component invokes the generate IV component requesting an IV for the selected video block. In block 404, the component selects the next bitplane of the selected video block. In decision block 405, if all the bitplanes have already been selected, then the component loops to block 401 to select the next video block, else the component continues at block 406. In block 406, the component encrypts the selected bitplane of the selected video block using an RC4 or SEAL encryption technique or some other appropriate encryption technique and loop to block 405. In blocks 407-414, the component loops selecting each bitplane of all encrypted blocks in the VOP to pack into video packets. In block 407, the component selects the next bitplane of all the blocks in the VOP from the most significant bitplane to the least significant bitplane. In decision block 408, if all the bitplanes have already been selected, then the component returns the encrypted video packets of the VOP, else the component continues at block 409. In block 409, the component selects the bitplane of the next block. In decision block 410, if all the blocks have already been selected for the selected bitplane, then the component loops to block 407 to select the next bitplane, else component continues at block 411. In block 411, the component adds the encrypted bitplane of the selected block to the current VP. In decision block 412, if it is the end of the current VP, then the component continues at block 413, else component loops to block 409 to select the bitplane of the next block. In block 413, the component ensures that the encrypted data in the current video packet has no VP delimiter. In block 414, the component starts a new video packet and then loops to block 411 to add the remainder of the select block to the new VP.

Figure 5:
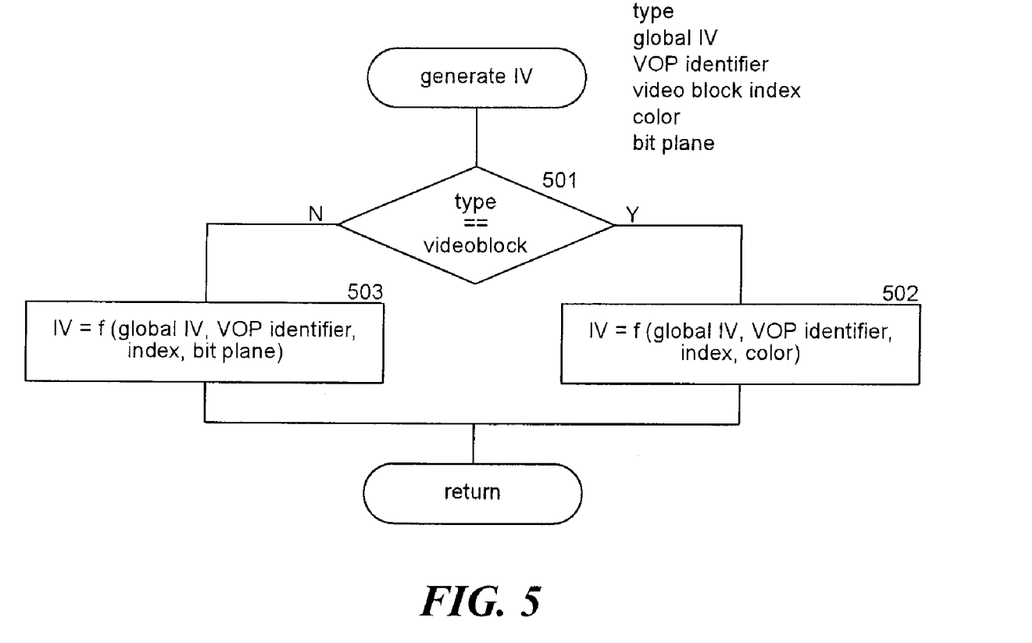
FIG. 5 is a flow diagram that illustrates the processing of the generate IV component in one embodiment.

FIG. 5 is a flow diagram that illustrates the processing of the generate IV component in one embodiment. The component is passed the type of segment, a global IV, a VOP identifier, a video block index, a color plane, and a bitplane. The component returns an IV for the type of segment. In decision block 501, if the type of segment is a video block, the component continues at block 502, else the component continues at block 503. In block 502, the component sets the IV to a function of the global IV, the VOP identifier, the video block index, and the color and then returns. In block 503, the component sets the IV to a function of the global IV, the index of the first macroblock in a video packet, and the bitplane and then returns.

Although the subject matter has been described in language specific to structural features and/or methodological acts, it is to be understood that the subject matter defined in the appended claims is not necessarily limited to the specific features or acts described above. For example, the principles of the encryption system may be used in conjunction with a variety of media and multimedia types and compression schemes. As an example, multimedia data may include a movie with both video and audio. The media data may be derived from a media signal or transmitted via a media signal. Also, MPEG-4 FGS based compression refers to any compression scheme that is compatible with or derived from MPEG-4 FGS compression. Accordingly, the invention is not limited except as by the appended claims.

We claim:

1. A method performed by a computing device for encrypting a video, the encrypted video being MPEG-4 syntax-compliant, the method comprising:
generating a global initialization vector for the video;
identifying independent encryption segments of the video; and
for each identified independent encryption segment,
generating by the computing device an initialization vector for the independent encryption segment that is derived from the global initialization vector and from a unique identifier of the independent encryption segment; and
encrypting data of the independent encryption segment using the generated initialization vector for the independent encryption segment, the encrypted data being syntax-compliant with MPEG-4 so that each independent encryption segment is encrypted independently of each other independent encryption segment
wherein the global initialization vector and the encrypted data of each independent encryption segment without the initialization vector for each independent encryption segment form an encrypted MPEG-4 syntax-compliant video that can be truncated without having to decrypt the encrypted data of the independent encryption segments.

2. The method of claim 1 wherein an independent encryption segment is a video packet of MPEG-4 Fine Grain Scalability compression.

3. The method of claim 1 wherein an independent encryption segment is a video block of MPEG-4 Fine Grain Scalability compression.

4. The method of claim 1 wherein the encrypting of an independent encryption segment applies an encryption scheme that generates syntax-compliant ciphertext.

5. The method of claim 4 wherein the encryption scheme is a locally iterative encryption scheme.

6. The method of claim 5 wherein the locally iterative encryption scheme in cipher block chaining mode is applied to full encryption blocks and the locally iterative encryption scheme in cipher feedback mode is applied to a last partial encryption block.

7. The method of claim 4 wherein the encryption scheme is a ciphertext switching scheme.

8. The method of claim 1 wherein the unique identifier for a video block is a VOP-specific number, a video block number, and an identifier of a color component.

9. The method of claim 1 wherein the unique identifier for a video packet is a VOP-specific number, a number of the first macroblock, and a bitplane identifier.

10. The method of claim 1 wherein buffering bits are added to encrypted data to stop emulation of delimiting markers.

11. A system for encrypting video data so that the encrypted video data is MPEG-4 syntax compliant, comprising:
   a memory storing computer-executable instructions of:
      a component that identifies a global initialization vector for the video data;
      a component that identifies segments of the video data;
      a component that generates an initialization vector for each segment that is derived from the global initialization vector and from a unique identifier of the segment;
      a component that encrypts each segment using the generated initialization vector for the segment so that the encrypted data in each segment does not include any delimiters of a video packet and is MPEG-4 syntax-compliant; and
      a component that packetizes the encrypted segments into an encrypted video codestream that includes the global initialization vector but not the initialization vectors for the segments; and
   a processor for executing the computer-executable instructions stored in the memory.

12. The system of claim 11 wherein a segment is a video block and encrypted data from multiple video blocks are stored in a video packet.

13. The system of claim 11 wherein a segment is a video packet.

14. The system of claim 13 wherein when the segment is a video packet, the component that encrypts applies a locally iterative encryption scheme.

15. The system of claim 13 wherein when the segment is a video packet, the component that encrypts applies a ciphertext switching scheme.

16. The system of claim 11 wherein the packetizing component adds buffering bits to stop emulation of delimiter markers in encrypted data.

17. A computer-readable device containing encryption of video data that is compressed using an MPEG-4 FGS based compression, the encryption being generated by a method comprising:
   identifying a global initialization vector for the video data;
   identifying independent encryption segments from the video data; and
   for each identified independent encryption segment,
      providing an initialization vector for the independent encryption segment, the initialization vector being derived from the global initialization vector and from a unique identifier of the independent encryption segment;
      encrypting the video data in the independent encryption segment using the provided initialization vector to generate ciphertext that is MPEG-4 syntax-compliant; and
      packetizing encrypted segments into an encrypted codestream without emulation of delimiting markers in the encrypted data so that the encrypted codestream is MPEG-4 syntax-compliant, the encrypted codestream including the global initialization vector but not including the initialization vectors of the independent encryption segments.

* * * * *